UNITED STATES PATENT OFFICE.

ALFRED MONNIER, OF SAN FRANCISCO, CALIFORNIA.

EXPLOSIVE COMPOUND.

SPECIFICATION forming part of Reissued Letters Patent No. 9,173, dated April 27, 1880.

Original No. 218,762, dated August 19, 1879. Application for reissue filed September 19, 1879.

*To all whom it may concern:*

Be it known that I, ALFRED MONNIER, of the city and county of San Francisco, in the State of California, have invented an Improvement in Explosive Compounds; and I do hereby declare that the following is a full, clear, and exact description of my said invention.

My invention has reference to the manufacture of explosive compounds in which chlorate of potassa is contained.

It consists in a process of reducing into minute particles and thoroughly mixing the chlorate with the other ingredients, and subsequently incorporating with the mass coal-tar or other tarry matter, so as to surround or envelop each particle of the chlorate, thereby obtaining a permanently soft and plastic explosive, free from liability to ignite prematurely by friction or shock.

Among the many known ways of making this class of explosives I may mention the grinding separately, in a dry state, of the chlorate of potassa and other substances, such as charcoal, crystallized sugar, alkaline salts, or metallic oxides, and the mixing of them subsequently with oily, fatty, or resinous substances, or the addition thereto of molasses, in order to form a non-drying compound and render the powder thus produced non-explosive by friction or percussion. In certain methods of manufacturing nitrate explosives, also, chlorate of potassa in small quantities has been used in solution and the mass allowed to cook or evaporate (without stirring) for several hours over a slow fire until it was reduced to the consistency of a paste, or else left to dry slowly.

In that class of explosive compounds containing no chlorate of potassa, such as nitrates of potassa, soda, or baryta explosives, the nitrates, in some instances, have been dissolved in water and the evaporation made without stirring, either when part or all the other ingredients were introduced; or the evaporation was made by stirring the whole mixture in a vacuum or partial vacuum. To compounds of this character coal-tar and other non-drying combustibles have been used as a cover for cartridges, grains or lumps of gunpowder, or other nitrate explosives, to preserve the powder from dampness or to render it non-explosive in the open air and from friction and concussion. These compounds, however, are different from and do not partake of the nature of chlorate-of-potassa explosives.

In my invention the thorough incorporation of coal-tar in the mass not only acts as a non-drying combustible, adding effect to the explosive character of the compound, but also, from its permanently soft nature, entirely prevents the ignition of the chlorate of potassa by friction or shock.

To carry out my invention and manufacture an explosive compound in accordance therewith, I can proceed in several ways; but the following is the most simple and practicable, and will serve fully to illustrate it.

Into a suitable pan or vessel provided with a double bottom for the introduction of steam I place the chlorate of potassa, together with a quantity of water necessary to dissolve it, steam being introduced beneath the bottom to facilitate dissolution. To this solution I then add the other substances that are to form the body of the compound, of which the soluble parts are likewise taken up and dissolved by the water. By means of suitable stirrers I maintain a constant agitation of the solution and the insoluble substances therein, so that as the heat applied thereto is continued the water is gradually evaporated and crystals of the dissolved ingredients are formed and deposited, which the agitation thoroughly and intimately incorporates with the other or insoluble substances. This agitation, while producing a homogeneous compound, has the effect also to crystallize the chlorate of potassa in exceeding fine crystals, and is an important part of the process.

In order to reduce any of the particles of the insoluble substances that have absorbed and taken up the chlorate when in the solution, and are not small enough to be properly mixed and incorporated with the coal-tar, I subject the mixture thus made to the action of a burr-mill. This operation in the manufacture is for the purpose of crushing any large particles of insoluble matter into which the chlorate has been absorbed during the evaporation process, in order that in the subsequent addition of coal-tar every particle of chlorate shall receive the coal-tar coating, as hereinbefore mentioned; but as this operation is performed while the mass is in a very moist or a semi-fluid state it is attended with no danger of ignition. The mixture is then combined with a certain proportion of coal-tar by placing it in a pan or vessel similar to the one above described, to which the coal-tar is then added, and a kneading action is then applied to the entire mass by means of rollers. Heat is also maintained in the vessel during this operation, to produce a perfect mixture of the tar with the particles of the compound.

The object of this part of my invention is to surround and envelop each and every particle of chlorate with an elastic and permanently soft cushion that shall protect them from being prematurely ignited by friction, percussion, or shock. After three hours (more or less) of such treatment, and when the mixture will form lumps when pressed in the hand without adhering to it, I remove the compound from this vessel and place it upon shelves in a room heated to about 180° Fahrenheit for a day or two. The compound is then ready for use.

Wood-tar or a mixture of tar and asphaltum or other tarry matter could be substituted for coal-tar.

The advantage of my invention is, that entirely safe and powerful explosive compounds can be made with chlorate of potassa as a base, without any danger attending either their manufacture, handling, or use. The thorough intermixing of the substances and their incorporation with the tarry matter perfectly isolates the minute particles of chlorate from one another, and produces a permanently soft compound that will explode only when fired under high pressure, and one that when fired without pressure will burn and not explode. It has the further advantage, also, of being free from injurious odors and producing comparatively little smoke.

Having thus described my invention, what I claim, and desire to secure by Letters Patent, is—

1. The improvement in explosive compounds containing chlorate of potassa, consisting in the addition of coal-tar or other tarry matter and its incorporation with the explosive mixture, so as to surround the particles of chlorate and provide an elastic and permanently soft cushion, and thus segregate the particles of chlorate from one another, substantially as specified.

2. The herein-described method or process of making explosive compounds containing chlorate of potassa as a base, consisting in dissolving in water the chlorate of potassa and the other soluble ingredients, and adding the insoluble ingredients which absorb the soluble substances and form the body of the compound, then crystallizing the dissolved salts by evaporating and agitating the solution, then grinding the mass, thereby reducing the insoluble substances with the adhering potassa and other soluble substances for their more thorough admixture, and finally adding coal-tar or other tarry matter and heating and kneading the entire mass, as specified.

Witness my hand this 17th day of February, 1880.

ALFRED MONNIER.

In presence of—
EDWARD E. OSBORN,
WM. F. CLARK.